Dec. 13, 1966     D. W. CROUCH     3,290,772
METHOD OF MAKING A BRAZED JOINT
Filed Feb. 5, 1964

INVENTOR:
DONALD W. CROUCH
BY William Freedman
ATTORNEY

United States Patent Office 3,290,772
Patented Dec. 13, 1966

3,290,772
METHOD OF MAKING A BRAZED JOINT
Donald W. Crouch, Newtown Square, Pa., assignor to General Electric Company, a corporation of New York
Filed Feb. 5, 1964, Ser. No. 342,757
4 Claims. (Cl. 29—493)

This invention relates to a method of making a brazed joint between a plate and a rod extending therethrough.

Typically, the first step in making a good brazed joint between a plate and a rod extending therethrough is the step of providing the rod with a properly located shoulder against which the plate can rest during the brazing operation. Usually, such a shoulder is formed on the rod by means of a machining or other metal-working operation, and such operation can be quite costly and time-consuming and can result in considerable wastage of metal.

In addition, it is sometimes most inconvenient to rely upon such shoulders since they must be facing upwardly in order to perform their supporting function during brazing; and for various reasons it might not be feasible to so position the shoulders. For example, the device being fabricated may have two such joints, and the shoulders of these joints might face in opposite directions. This would interfere with brazing of joints simultaneously in a brazing oven inasmuch as one shoulder would not be able to perform its supporting function while the other one was.

Brazing fixtures designed for repetitive use in a brazing oven have sometimes been used to hold the parts during brazing. But these fixtures are usually quite expensive and bulky and must lend themselves to repetitive use without impairment despite their repeated exposure to the heat of brazing.

An object of my invention is to form a brazed joint between a plate and a rod extending therethrough by a simple, inexpensive method that requires no expensive machining or other working of the rod and which requires no involved oven brazing fixtures.

In carrying out my invention in one form, I provide a metallic rod and a metallic plate that has an opening therein for receiving the rod. I also provide first and second metallic rings, each having protuberances that extend radially inwardly of the ring and are so located that the protuberances will firmly engage the outer periphery of the rod when the ring is placed about the rod. The first ring is slid axially of the rod into a predetermined position on the rod. Thereafter the plate is positioned on the rod with the opening of the plate receiving the rod and the plate located immediately adjacent the first ring. The second ring is thereafter slid on to the rod into a position wherein the two rings sandwich the plate therebetween and prevent axial movement of the plate relative to the rod. A ring of brazing metal is placed about the rod adjacent one of the metallic rings on an axial side of said one ring opposite the location of said plate. The resulting assembly is heated with the brazing ring positioned above said one metallic ring to cause molten brazing metal to flow axially of the rod past said one ring into the space between the outer periphery of the rod and the plate. Thereafter the assembly is cooled to cause the molten brazing metal to solidify and form a bond between the plate and the rod.

For a better understanding of my invention, reference may be had to the following specification taken in conjunction with the accompanying drawing, wherein.

Figure 1:
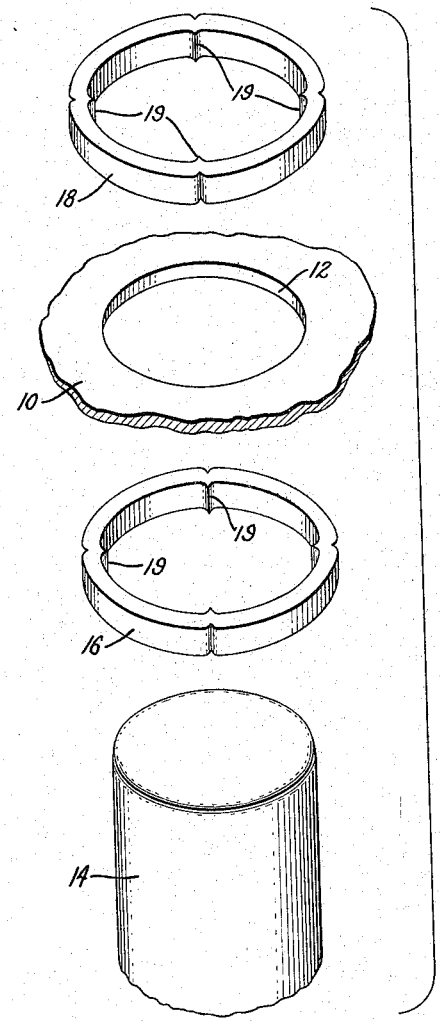
FIG. 1 is an exploded perspective view of some of the parts used in making a joint in accordance with one form of my invention.

Referring now to FIG. 1, there is shown a metallic plate 10 having an opening 12 therein for receiving a metallic rod 14. It is desired to join the plate 10 to the rod 14 at a preselected position on the rod. In one application of the invention, the joint is to be a high quality brazed joint that is capable of forming a vacuum-tight seal between the plate and the rod.

Figure 2:
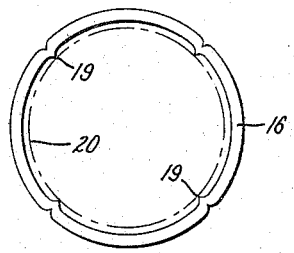
FIG. 2 is an enlarged plan view of one of the components of the joint.

The first step in producing the brazed joint involves providing two metallic rings such as shown in 16 and 18 in FIGS. 1 and 2. Each of these rings has a series of circumferentially-spaced protuberances 19 formed therein and projecting radially inward from the body of the ring. These protuberances are formed by deforming the metallic ring in a radially-inward direction with a suitable tool applied to the outer periphery of the ring.

The protuberances 19 are so located that when the ring 16 or 18 is slid onto the rod 14, the protuberances will firmly engage the rod and resist relative movement of the ring on the rod. In this respect, referring to FIG. 2, the reference circle 20 defined by the innermost edge of the protuberances preferably has a diameter .003 to .005 inch smaller than that of the rod 14. Accordingly, when the ring 16 or 18 is slid onto the rod 14, the innermost edge of the protuberances digs slightly into the outer periphery of the rod. Despite this slight interference between the ring and the rod, an assembler using only his fingers can usually exert sufficient force to push the ring axially of the rod into a desired position on the rod. This is the case because the ring has an appreciable amount of resilience that permits some yielding of the ring to facilitate pressing of the ring on to the rod. This resilience is due in part to the clearance space between the rod and the ring located between the circumferentially-spaced protuberances 19.

Figure 3:
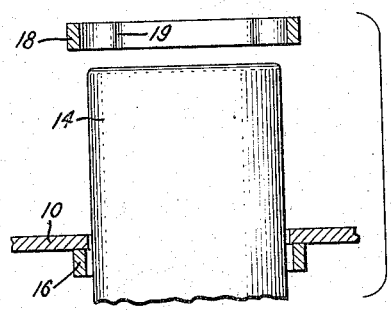
FIG. 3 shows an intermediate step in making the joint.
Figure 4:
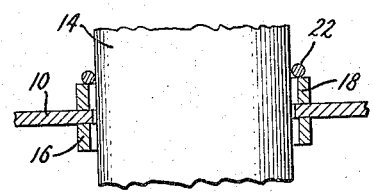
FIG. 4 shows a more advanced intermediate step in in making the joint.

The assembler thus presses the ring 16 on to the rod 14, moving it downwardly until a desired position is reached. He then slides the plate 10 on to the rod with the rod extending through the opening 12 and thereafter supports the plate on the ring 16 as shown in FIG. 3. Next he presses the other ring 18 on to the rod, forcing it downwardly until it abuts against the plate 10, as shown in FIG. 4. When this occurs, the plate 10 is sandwiched between the two rings 16 and 18 and is thus firmly held against movement axially of the rod in either direction.

Thereafter, a ring 22 of brazing metal is slipped about the rod 14 and is supported on the upper ring 18. The entire assembly shown in FIG. 4 is then placed in a brazing oven, which creates a high enough temperature to melt the brazing metal. The molten brazing metal runs down the rod 14 passing through the space between the inner periphery of the ring 18 and the rod 14 and filling the annular clearance space between the opening 12 of the plate 10 and the outer periphery of the rod 14. An additional quantity of the molten brazing metal runs even further down the rod 14 and into the clearance space between the lower ring 16 and the rod 14. Thereafter, the assembly is cooled and the brazing metal solidifies to form a high quality brazed joint between the rod and the surrounding inner periphery of the plate 10. The brazing metal disposed between the inner periphery of each of the rings 16 and 18 and the outer periphery of rod 14 also solidifies and forms a bond between these rings and the rod.

By initially locating the brazing ring at the outer side of the joint instead of between the parts being joined, the ring may melt during the brazing operation without introducing any voids in the space formerly occupied by the brazing ring and without affecting the spacing or location of the parts.

Figure 6:
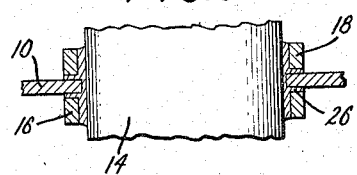
FIG. 6 is a sectional view showing a modified form of joint.

To impart increased mechanical strength to the assembly, thin annular shims of brazing metal can be interposed between each of the rings 16, 18 and the plate 10. Such shims are shown in 26 in FIG. 6. The above-described heating and cooling operations will convert each of these shims into a high strength bond between the ring and the plate at the interface of these two parts. Very little of the metal of each shim will be displaced from its initial location during the brazing operation because each shim is very thin and because it lies in a horizontal plane sandwiched between horizontally extending parts.

The rings 16 and 18 should be made of a metal that has a coefficient of thermal expansion equal to or lower than that of the rod 14. This relationship helps to assure that during the heating accompanying brazing, there will be no loosening of the rings on the rod that could permit the parts to accidently shift out of their desired position. Although a suitable location-guide (not shown) may temporarily be provided about the rod 14 to assist in locating the ring 16 on the rod, this guide tube is removed before the assembly is placed in the brazing oven. Thus, only the rings 16 and 18 hold the plate 10 in place during the heating operation, and it is therefore important that the rings not loosen on the rod during this interval. Along this same line, the modulus of elasticity of the ring should be sufficiently high at the brazing temperature to prevent the ring from losing its ability to provide a firm grip on the rod. In one embodiment of the invention, the rings 16 and 18 are of steel and the rod 14 of copper.

Joints formed in the manner described hereinabove have been evaluated for use in high vacuum devices and have been found capable of providing a leak-free vacuum-tight seal between the rod 14 and the plate 10. Moreover, the joints have proven to be rugged and capable of withstanding without damage relatively high mechanical forces applied longitudinally of the rod.

In forming a vacuum-tight joint, it is important that the surfaces of the metal parts be rigorously cleaned before their assembly and be maintained in such condition until the brazing operation is completed.

It will be apparent that my invention enables the plate 10 to be readily joined to the rod 14 at any desired location on the rod. Yet, the rod may be of the simplest and most inexpensive configuration. There is no need to complicate the configuration of the rod by providing the usual plate-supporting shoulder; and the machining or other metal-working operation customarily relied upon to form the shoulder is dispensed with, eliminating the cost of this operation.

Figure 5:
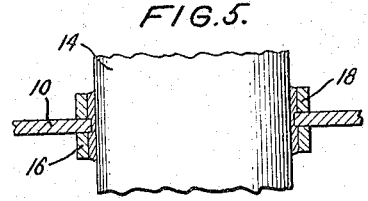
FIG. 5 is a sectional view showing the completed joint.

When the plate 10 is sandwiched between the two rings 16 and 18, as shown in FIG. 4, the plate is firmly held in a desired position on the rod. Even if the rod is inverted, the plate 10 still remains firmly anchored to the rod in the same position as shown. Thus, if several brazed joints of the type shown in FIG. 5 are to be made simultaneously in a particular device, as by heating the entire device in a brazing oven, it is possible to invert the assembly of FIG. 4, if necessary, in order to facilitate this simultaneous brazing of the joints.

Figure 7:
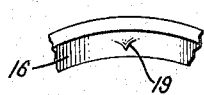
FIG. 7 is a perspective view of a portion of a modified form of joint component.

In FIG. 2, the protuberances 19 on the ring 16 provide line contact with the rod 14. I can alternatively shape the protuberances as shown in the perspective view of FIG. 7 so that the contact between the rod and protuberance will be essentially point-contact. After the ring of FIG. 7 is pushed onto the rod into its desired position axially of the rod, it is then rotated slightly on the rod. Since the protuberances dig into the metal of the rod, this rotation of the ring locks the ring more firmly against axial movement on the rod and thus aids in preventing accidental displacement of the ring axially of the rod.

It is to be understood that the term "plate," as used herein, is intended to comprehend any member having a plate-like form in the region of the joint and also to comprehend a member formed of a plurality of layers, as well as one formed of a single layer, as is the case with the illustrated plate 10.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A method of making a brazed joint between a metallic rod and a metallic plate that has an opening therein for receiving said rod, comprising:
    (a) providing first and second metallic rings, each having protuberances that extend radially inwardly of the ring and are so located that the protuberances will firmly engage the outer periphery of said rod when the ring is placed about the rod,
    (b) sliding said first ring axially of the rod into a predetermined position on the rod,
    (c) positioning said plate on said rod with the opening in said plate receiving said rod and the plate located immediately adjacent said first ring,
    (d) sliding said second ring onto said rod into a position wherein said two rings sandwich the plate therebetween and prevent axial movement of said plate relative to said rod,
    (e) placing a ring of brazing metal about said rod adjacent one of said metallic rings on an axial side of said one ring opposite to the location of said plate,
    (f) heating the resulting assembly with said brazing ring positioned above said one metallic ring to cause molten brazing metal to flow axially of said rod past said one ring into the space between the outer periphery of said rod and the plate,
    (g) cooling said assembly to cause the molten brazing metal to solidify and form a bond between said plate and said rod.

2. The method of claim 1 in which said metallic rings are maintained in firm engagement with said rod during said heating whereby to prevent relative movement of said metallic rings relative to said rod during said heating.

3. A method of making a brazed joint between a metallic rod and a metallic plate that has an opening therein for receiving the rod, comprising:
    (a) providing a ring having protuberances that extend radially inward of the ring and are so located that the protuberances will firmly engage the outer periphery of said rod when the ring is placed about the rod,
    (b) sliding said ring axially of the rod into a predetermined position on the rod,
    (c) positioning said plate on said rod with the opening in said plate receiving said rod and the plate located immediately adjacent said ring,
    (d) placing a ring of brazing metal about said rod adjacent the outer side of one of said parts mounted thereon,
    (e) heating the resulting assembly with said brazing ring positioned above said parts to cause molten brazing metal to flow axially of said rod into the space between the outer periphery of said rod and the plate,
(f) cooling said assembly to cause the molten brazing metal to solidify and form a bond between said plate and said rod.

4. The method of claim 3 in which the protuberances on one of said rings provide generally point-contact with said rod and dig into the metal of said rod and in which said latter ring is rotated with respect to the rod after being slid into said predetermined position on the rod.

References Cited by the Examiner
UNITED STATES PATENTS

| 2,157,918 | 5/1939 | Rankin | 285—287 |
| 2,755,112 | 7/1956 | Klancnik | 29—525 |
| 2,851,771 | 9/1958 | Pottmeyer | 29—493 |
| 2,957,237 | 10/1960 | Regle et al. | 29—470.5 |
| 2,988,386 | 6/1961 | Humpel | 287—114 |

JOHN F. CAMPBELL, *Primary Examiner.*
L. J. WESTFALL, *Assistant Examiner.*